Sept. 2, 1952     E. PERMAN     2,609,209
CHUCK

Filed Sept. 20, 1949     2 SHEETS—SHEET 1

Inventor
E. Perman
By Glascock Downing &c.
Attys.

Sept. 2, 1952          E. PERMAN          2,609,209
CHUCK
Filed Sept. 20, 1949          2 SHEETS—SHEET 2
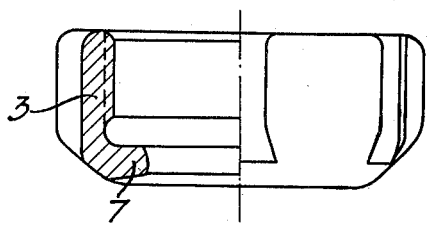
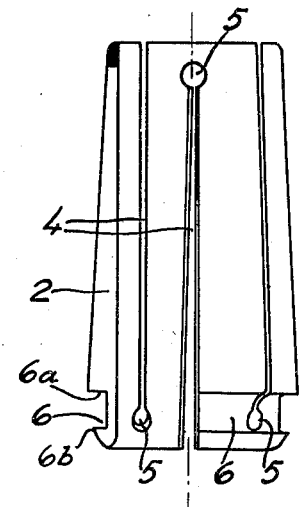
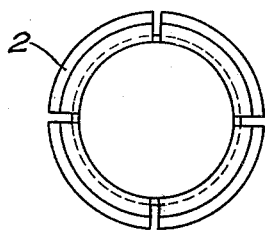
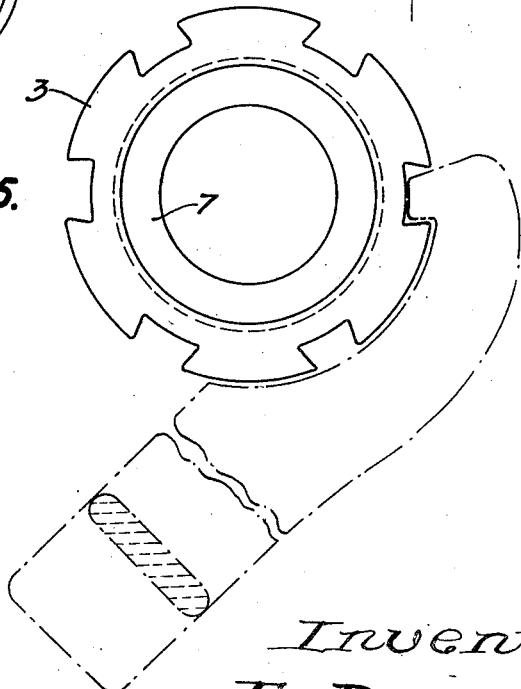
Inventor
E. Perman Patented Sept. 2, 1952

2,609,209

UNITED STATES PATENT OFFICE 2,609,209

CHUCK

Einar Perman, Eskilstuna, Sweden

Application September 20, 1949, Serial No. 116,796
In Sweden September 23, 1948

6 Claims. (Cl. 279—49)

The present invention relates to those chucks which comprise an outer sleeve or a corresponding chuck body which is arranged to be connected with a machine spindle or the like in some way or other, further a conical, slotted collet, and a ring or nut adapted to be screwed on the outer sleeve, the collet being tightened by means of said ring or nut around the tool to be clamped by being pushed with the ring into the outer sleeve which tapers in a corresponding manner.

Chucks of this type are known in various embodiments, but all of them, at least those to be had in the market with a device for loosening the collet, are characterized in that the collet or jaw set, if such is used, is tapering in both ends, and that particularly the cone at the outer end has a great cone angle. This double conicity impairs the tightening.

The present invention has for its object to eliminate this drawback and its substantial feature is that at its outer end the collet has an annular narrow surface which is coaxial with the ring and the collet, and arranged crosswise to the longitudinal axis of the chuck, said surface corresponding to a similar surface of the ring for pressing the collet into the outer sleeve and for tightening the tool.

Different chucks have been tested and it has appeared that those having double conicity or a double cone in many cases even do not possess half the gripping capacity of the chuck having the single cone collet according to this invention, applying the same tightening force. This might be due to the fact that less friction resistance is obtained between the ring and the collet than in double cone collets.

An embodiment of the invention is illustrated in the accompanying drawing.

Fig. 2 shows in like manner the screw ring,

Fig. 3 shows in like manner the collet,

Fig. 4 shows the collet viewed from the outer end, i. e. the lower end in Fig. 3, and Fig. 5 shows how the screw ring is arranged to be tightened and loosened with a key.

Figure 1:
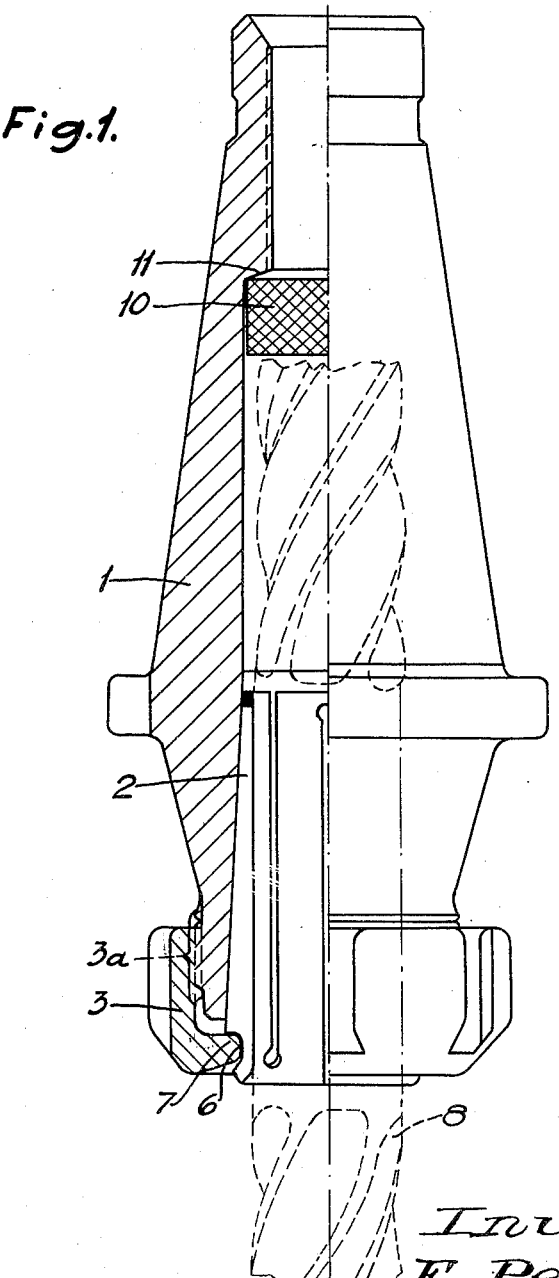
Fig. 1 shows the chuck, in side view and in axial section along the middle line.

The outer sleeve or the corresponding body—it may be a holder without through bore—is designated by 1, the collet by 2 and the screw ring or nut by 3, the latter being provided with threads, as at 3a, engaging the outer sleeve. The outer sleeve is adapted in the usual manner to be pushed into the machine spindle and be brought into frictional engagement therewith. To this end, it is tapered in its one end portion. In the opposite end portion the outer sleeve has, as usual, an inner cone corresponding to an outer cone on the collet 2. In order to become resilient, the collet is slotted from both ends, as will be seen particularly in Fig. 3, and the slots 4 merge in holes 5 in the material of the collet, as usual. Yet, the holes are not necessary. At the outer, wider end the collet has a groove 6 turned into the collet wall. This groove corresponds to a flange 7 on the inside of the ring 3, adapted, as shown in Fig. 1, to engage the groove 6. The groove and the flange are formed with the aforementioned annular surfaces 6a and 6b respectively which are arranged crosswise to the longitudinal axis of the chuck. When pressing said surfaces against one another by unscrewing or screwing in the ring on the outer sleeve, the collet is pressed into the outer sleeve and is thus tightened against the tool. Said tool is exemplified in Fig. 1 as a double shank end mill 8.

The fixing of the tool in the chuck is thus very simple. The loosening of the tool is just as simple, and is highly facilitated by the collet 2, when the ring is unscrewed, being drawn outwardly due to the groove 6 and the flange 7. Thanks to this detail the chuck is considerably improved over several chucks to be had in the market, in which chucks the collet often has to be loosened by striking against the same, after the screw ring has been loosened.

The chuck may be modified in many respects within the frame of the invention. As already indicated, the collet may be replaced by jaws, and said set of jaws is provided with grooves analogously with the groove 6. In the collet as well as in said set of jaws the groove 6 and the flange 7 may change places, i. e. the groove 6 may be made in the ring 3 and the flange may be arranged on the collet 2 or on the jaw set. It will be understood that the cone angle may be varied within certain limits.

In the outer sleeve is located a resilient bottom 10, preferably in the form of a rubber plate supporting against a shoulder 11 in the outer sleeve, to protect the tool if it is provided with easily damaged cutting edges or the like also in that end which is introduced into the chuck. The length of the outer sleeve 1 and consequently the depth of the hole for the tool are dimensioned for said mills and are made as short as possible, in order that the part extending outside the holder shall become as stable as possible. By this the play between the bottom of the outer sleeve and the end of the large mills will be very small, only a few millimeters. For this reason, it is very easy to thrust the mill against the bottom of the sleeve and thus damage the cutting edges of the mill, the mill being at the same time not completely clamped because during the clamping of a tool the latter follows the collet into the outer sleeve according as the ring is tightened. If a tool has been pushed down to the very bottom of a chuck having no resilient buffer 10, the tool consequently cannot be displaced further upwardly at the tightening but the collet must slide along the tool shank when the ring is tightened. During this operation an extra frictional resistance arises. This axially acting force can become so great that the end cutting edges of the mill which rest against the bottom of the outer sleeve, cannot absorb this pressure but will break. It is clear that, applying the same tightening force, a tool will not be clamped so well if it is pushed down to the bottom of the chuck as if it does not reach the fixed bottom of the outer sleeve or if it is inserted in a chuck provided with an elastic buffer. Often the tool has been clamped so badly that it slides round when feeding the tool. The result will be that the cutting edges will break or that the whole tool will "fling" off.

Complaints against double shank end mills which have burst and at the same time show annular scratches around the shank, prove that the chucks to be had in the market are not quite reliable. In certain cases even that part of the mill has become twisted off which is situated within the chuck. This must be due to the fact that the shank of the mill has slid round in the collet and the mill has been pressed still further down towards the chuck body. Thus, the mill has, so to say, been clamped with its both ends and in that way been twisted off by the engine power.

A 30 mm. chuck was loaded with weights and it appeared that the clamping of a tool becomes about 40% less when the tool rests against the bottom of the chuck body than when it rests against a stop of rubber.

The following advantages are obtained by using a resilient stop (e. g. a rubber buffer):

1. The end cutting edges of shank end mills are protected against percussions at the mounting.
2. The end cutting edges are protected against hard pressures when tightening the nut.
3. The tool obtains a possibility of displacing itself axially together with the collet and the nut, without it being necessary to take any precautionary measure at the mounting of the tool, which is a condition for a complete and effective tightening of the chuck.
4. A quicker and easier mounting of the tool is obtained.

Having now described my invention, what I claim as new and desire to secure by Letters Patent is:

1. Chuck, comprising an outer sleeve-like body a single taper slotted collet adapted to be inserted in the sleeve-like body and a ring adapted to be screwed on said outer sleeve-like body for securing the collet to the sleeve-like body, said collet being tightened by means of said ring around the tool to be clamped in the chuck by pressing a surface of said ring, which surface is arranged radially of the longitudinal axis of the chuck, against a complemental surface of said collet, the tightening surface of said collet constituting a continuous external groove arranged in the collet and the tightening surface of the ring constituting a continuous flange engaging the said groove, the inner groove wall active at the tightening of the collet, having a larger contact surface for the flange, viewed radially, than the facing outer groove wall which is active during the loosening of the collet, so that the collet provides the flange with a rather large tightening surface but at the same time a rather small loosening surface, whereby the collet, after it has been removed from the sleeve-like body by unscrewing the ring from said body, is detachable from the ring by being slightly rocked aside therein.

2. Chuck according to claim 1, in which the collet comprises a set of clamping jaws, provided with curved tightening surfaces.

3. Chuck according to claim 1, in which the sleeve-like body has an elastic bottom, comprising a rubber piece inserted in said body.

4. Chuck according to claim 1 in which the ring constitutes a nut.

5. A chuck assembly including a body portion having a bore therein, a single taper slotted collet adapted to be inserted in said bore and an annular retaining member threadedly engaging the body portion for securing said collet to the body portion, the said collet being provided with a continuous annular groove immediately adjacent the larger end of the collet and the said retaining member having a continuous annular flange adjacent the lower end thereof engaging said annular groove, the inner wall of said groove active at the tightening of the collet, having a larger contact area for said flange, viewed radially, than the facing outer wall of said groove which is active during the loosening of the collet, so that said collet provides the flange with a rather large tightening surface but at the same time a rather small loosening surface, whereby the collet, after it has been removed from the body portion by unthreading said annular retaining member from said body portion, is detachable from said annular retaining member by being slightly rocked aside therein.

6. A chuck assembly as defined in and claimed by claim 5, further characterized in that the junction of the inner wall of the groove with the outer periphery of the collet is the point of greatest diameter of the collet.

EINAR PERMAN.

REFERENCES CITED

The following references are of record in the file of this patent:

UNITED STATES PATENTS

| Number | Name | Date |
| --- | --- | --- |
| 1,953,830 | Park | Apr. 3, 1934 |
| 2,118,485 | Brown | May 24, 1938 |
| 2,345,069 | Philips | Mar. 28, 1944 |
| 2,381,335 | Clare | Aug. 7, 1945 |
| 2,469,014 | Stalhandske | May 3, 1949 |